United States Patent
Hirobe et al.

(10) Patent No.: US 8,046,189 B2
(45) Date of Patent: Oct. 25, 2011

(54) MOTION SENSING PROGRAM AND ELECTRONIC COMPASS WITH MOTION SENSING PROGRAM

(75) Inventors: Kisei Hirobe, Miyagi-ken (JP); Katsuyuki Kawarada, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 254 days.

(21) Appl. No.: 12/477,543

(22) Filed: Jun. 3, 2009

(65) Prior Publication Data

US 2009/0248352 A1  Oct. 1, 2009

Related U.S. Application Data

(63) Continuation of application No. PCT/JP2007/073505, filed on Dec. 5, 2007.

(30) Foreign Application Priority Data

Dec. 6, 2006  (JP) .................. 2006-329034

(51) Int. Cl.
*G01C 17/00* (2006.01)
*G01B 7/30* (2006.01)
*G06F 15/00* (2006.01)

(52) U.S. Cl. ................ 702/150; 33/316; 701/224

(58) Field of Classification Search ................ 702/150, 702/152, 153, 158, 160, 163, 175; 33/316, 33/356; 324/247; 342/359; 701/224
See application file for complete search history.

(56) References Cited

U.S. PATENT DOCUMENTS 7,086,164 B2 *  8/2006  Satoh et al. .................. 33/316
2003/0023380 A1 *  1/2003  Woloszyk et al. ............ 701/224

FOREIGN PATENT DOCUMENTS

| JP | 2003-5879   | 1/2003 |
| JP | 2003-198670 | 7/2003 |
| JP | 2006-128789 | 5/2006 |

OTHER PUBLICATIONS

Search Report dated Feb. 12, 2008 from International Application No. PCT/JP2007/073505.

* cited by examiner

*Primary Examiner* — John H Le
(74) *Attorney, Agent, or Firm* — Beyer Law Group LLP

(57) ABSTRACT

A motion sensing program for executing a motion sensing based on at least a biaxial output of a magnetic sensor, which includes the steps of determining with respect to execution of the motion sensing based on the output of the specific biaxial output of the magnetic sensor upon its rotation in a predetermined direction, and identifying the rotating direction when execution of the motion sensing is determined.

11 Claims, 4 Drawing Sheets

MOTION SENSING PROGRAM AND ELECTRONIC COMPASS WITH MOTION SENSING PROGRAM

CLAIM OF PRIORITY

This application is a Continuation of International Application No. PCT/JP2007/073505 filed on Dec. 5, 2007, which claims benefit of the Japanese Patent Application No. 2006-329034 filed on Dec. 6, 2006, which are hereby incorporated by reference.

BACKGROUND OF THE INVENTION

1. Field of the Invention

The present invention relates to a motion sensing program for executing a motion sensing using a magnetic sensor for detecting geomagnetism, and an electronic compass having the motion sensing program installed therein.

2. Description of the Related Art

Recently, the mobile terminal device with a function for detecting tilted and shaken states of the main body of the device has been developed. The aforementioned mobile terminal device requires the tilt sensor for detecting the tilt angle of the tilted main body of the device, and the acceleration sensor for detecting the oscillation resulting from shaking of the main body of the device. There has been provided a mobile terminal device for enabling the operation (motion) such as screen scroll based on the output of the magnetic sensor for detecting geomagnetism without installing the aforementioned tilt sensor and the acceleration sensor (Japanese Unexamined Patent Application Publication No. 2006-128789). In the related art, the user executes the motion sensing while being directed in the specific orientation so as to execute the function correlated with the motion.

In the aforementioned related art as disclosed in Japanese Unexamined Patent Application Publication No. 2006-128789, the output value may vary accompanied with the change in the orientation to which the user who holds the mobile terminal device is directed. In other words, the output value obtained when the user is directed eastward is different from the one obtained when the user is directed westward. For this, the process for identifying the orientation to which the user is directed, for example, calibration is required. Otherwise the motion sensing cannot be executed accurately.

The "motion" involuntarily performed by the user in the normal use range, for example, lifting up the horizontally placed mobile terminal device is likely to be erroneously detected. The detection error may also be caused by the magnetic source which moves around the device.

SUMMARY OF THE INVENTION

The present invention provides a motion sensing program which allows the accurate motion sensing without requiring such processing as calibration, and the electronic compass having the motion sensing program installed therein.

The motion sensing program according to the present invention is executable by a computer for a motion sensing based on at least a biaxial output of a magnetic sensor, and includes the steps of determining with respect to execution of the motion sensing based on a specific biaxial output of the magnetic sensor upon its rotation in a predetermined direction within a predetermined period of time, and identifying a rotating direction of the magnetic sensor when the execution of the motion sensing is determined.

The structure is capable of identifying the rotating direction to execute the accurate motion sensing without requiring such process as calibration. In the motion sensing program, the distance between two axes among X-, Y-, and Z-axis in the output coordinate is obtained, based on which the threshold determination is made to execute the motion sensing. This makes it possible to prevent the error of the motion sensing resulting from such micromotion as hand shaking, and the mere rotating operation.

In the step of determining with respect to execution of the motion sensing of the motion sensing program according to the present invention, preferably, the execution of the motion sensing is determined when a distance between a measurement starting point to a most distal measurement point from the measurement starting point in a coordinate of the specific biaxial output of the magnetic sensor is equal to or larger than a first predetermined value, and a distance between a measurement point resulting from substantially returning the magnetic sensor to a rotation starting position and the measurement starting point is equal to or smaller than a second predetermined value. Only when the reciprocated rotating operation is detected, it is determined that the motion sensing is executed. This makes it possible to suppress the detection error resulting from the involuntary action and the peripheral magnetic field.

In the step of identifying the rotating direction of the motion sensing program according to the present invention, preferably, the rotating direction is identified based on a direction of a normal vector defined by a virtual line which connects a midpoint between a measurement starting point and the most distal measurement point to the measurement starting point, and a virtual line which connects the midpoint to the most distal measurement point.

An electronic compass according to the present invention includes a compass module equipped with a magnetic sensor, and a control unit provided with the aforementioned motion sensing program for executing a motion sensing based on an output of the magnetic sensor, and an azimuth calculation program for obtaining an azimuth based on the output of the magnetic sensor.

A mobile terminal device according to the present invention includes the aforementioned electronic compass installed therein to obtain the azimuth and perform a switching operation.

A mobile terminal device according to the present invention includes a magnetic sensor, and a control unit provided with the motion sensing program according to claim 1 for executing the motion sensing based on an output of the magnetic sensor, and an azimuth calculation program for obtaining an azimuth based on the output of the magnetic sensor. A switching operation is performed by the motor sensing.

In the mobile terminal device according to the present invention, preferably, the magnetic sensor is rotated in the predetermined direction with respect to an axis of a longitudinal direction in a plane of the device surface.

The motion sensing program according to the present invention determines with respect to execution of the motion sensing based on the specific biaxial output of the magnetic sensor upon its rotation in a predetermined direction within a predetermined time period using at least biaxial output of the magnetic sensor. If execution of the motion sensing is determined, the rotating direction is identified. This makes it possible to execute accurate motion sensing without requiring such process as calibration.

DESCRIPTION OF THE PREFERRED EMBODIMENTS

Figure 1A:
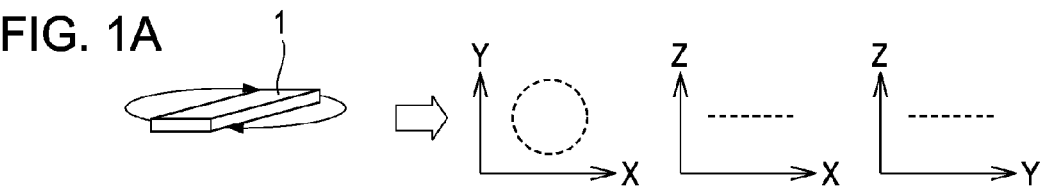
FIGS. 1A to 1C represent the motion sensing executed by the motion sensing program according to an embodiment of the present invention.

An embodiment of the present invention will be described referring to the drawings.

Figure 1B:
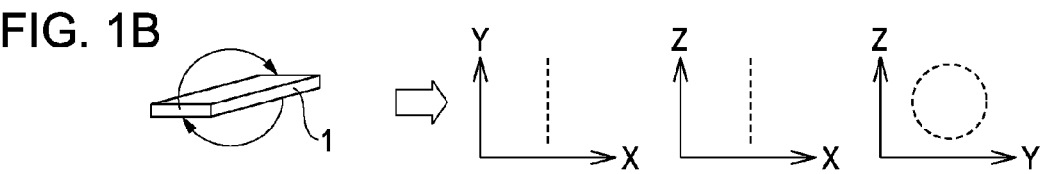
Figure 1C:
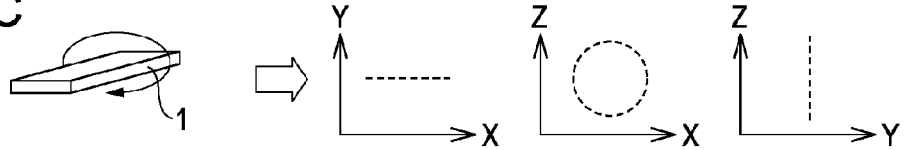

The motion sensing executed by the motion sensing program according to the present invention functions in sensing the motion upon rotation of the magnetic sensor in a predetermined direction. FIGS. 1A to 1C show respective rotating directions of the magnetic sensor. Specifically, FIG. 1A shows the state where a magnetic sensor 1 is rotated horizontally (rotation with respect to the vertical axis). FIG. 1B shows the state where the magnetic sensor 1 is rotated longitudinally (rotation with respect to the horizontal axis). FIG. 1C shows the state where the magnetic sensor 1 is rotated laterally (rotation with respect to the horizontal axis). Each state shown in FIGS. 1B and 1C represents the rotation with respect to the horizontal axis. In the case where the device having the magnetic sensor 1 installed therein (for example, mobile terminal device) has a substantially rectangular solid shape having long and short axes, the rotation shown in FIG. 1B is the one with respect to the horizontal short axis. The rotation shown in FIG. 1C is the one with respect to the horizontal long axis (longitudinal direction in the plane of the device surface). The horizontal direction of each rotation shown in FIGS. 1B and 1C denotes the direction in the plane of the device surface having the magnetic sensor installed therein rather than the horizontal direction with respect to the ground surface.

When the magnetic sensor is rotated at 360° in each direction shown in FIGS. 1A to 1C, a substantially circular output is obtained in the output coordinate of any of the X-axis, Y-axis, and Z-axis. In case of the horizontal rotation shown in FIG. 1A, the phase output at 90° is observed in the output coordinate of X-Y-axis while having the Z-axis output unchanged. In case of the longitudinal rotation shown in FIG. 1B, the phase output at 90° is observed in the output coordinate of Y-Z-axis while having the X-axis output unchanged. In case of the lateral rotation shown in FIG. 1C, the phase output at 90° is observed in the output coordinate of X-Z-axis while having the Y-axis output unchanged.

Figure 2A:
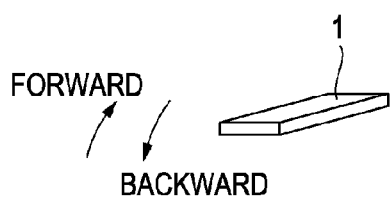
FIGS. 2A and 2B are explanatory views with respect to the motion sensing executed by the motion sensing program according to an embodiment of the present invention.
Figure 2B:
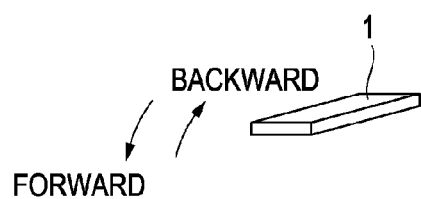

In the embodiment, the case in the lateral rotating direction (see FIG. 1C) will be described referring to FIGS. 2A and 2B. In the motion sensing of this case, the magnetic sensor 1 is rotated in a reciprocating manner in the lateral direction at approximately 60° as shown in FIGS. 2A and 2B. In this case, it is preferable to perform the reciprocated rotation at a relatively high speed (0.5 to 1 sec.) so as to be distinguished from the other operation. Selection between forward and backward directions allows the bi-directional sensing, that is, positive direction (FIG. 2A) and negative direction (FIG. 2B).

In the case where the electronic compass having the program installed therein is mounted on the mobile terminal, the lateral rotation is the motion intentionally performed by the user compared with the horizontal rotation. With the use of the motion switch, such rotation may be easily distinguished from the other operation, which is effective for suppressing the error.

The principle of the motion sensing according to the present invention will be described.

In the description, it is assumed that the magnetic sensor is of triaxial type, and the lateral direction is set as the predetermined rotating direction. The phase output at 90° is observed in the X-Z-axis output coordinate while having the Y-axis output unchanged.

Figure 3A:
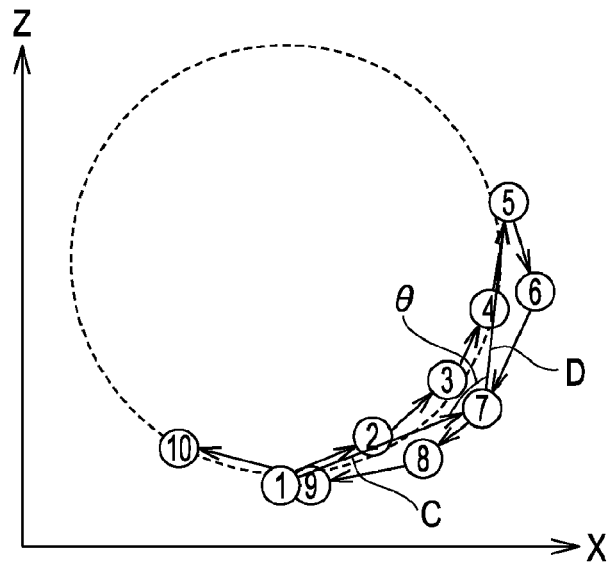
FIGS. 3A and 3B represent the principle of the motion sensing executed by the motion sensing program according to an embodiment of the present invention.
Figure 3B:
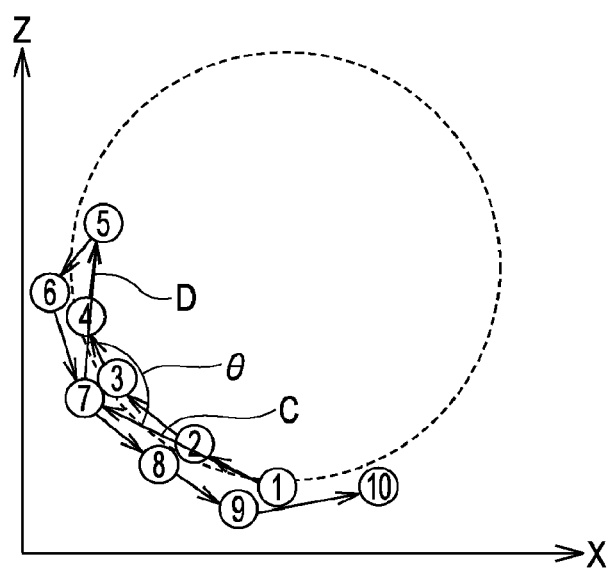

When the magnetic sensor is reciprocated in the lateral (positive) direction as shown in FIG. 2A, outputs of the Z-axis and X-axis sensors are plotted into the circular track in the Z-X-axis output coordinate as shown in FIG. 3A. When the magnetic sensor is reciprocated in the lateral (negative) direction as shown in FIG. 2B, outputs of the Z-axis and X-axis sensors are plotted into the circular track as the Z-X-axis output coordinate as shown in FIG. 3B. Actually, the outputs of the Z-axis and X-axis sensors are plotted around the circular track without being accurately plotted on the circular track owing to the hand shaking. Each of encircled numbers shown in FIG. 3 denotes the plotting order.

The motion sensing program according to the present invention requires at least biaxial output of the magnetic sensor. The determination is made with respect to the motion sensing based on the specific biaxial output of the magnetic sensor, which rotates in the predetermined direction. The rotating direction may be identified when execution of the motion sensing is determined.

The determination with respect to execution of the motion sensing is made upon the rotating operation of the aforementioned magnetic sensor 1 when a distance A from a measurement starting point to the most distal measurement point therefrom in Z-X-axis output coordinate is equal to or larger than a predetermined value, and a distance B from a measurement point resulting from returning the magnetic sensor to the original position (returned to the rotation starting point) to the measurement starting point in Z-X-axis output coordinate is equal to or smaller than the predetermined value. Specifically, referring to FIG. 3, the determination is made on the basis of the distance A from the measurement starting point to the most distal measurement point (distance from the measurement starting point 1 to the most distal measurement point 5), which is equal to or larger than the predetermined threshold value, and the distance B from the measurement starting point 1 to the measurement point resulting from returning the magnetic sensor to the original position, that is, the measurement point among those obtained subsequent to the measurement of the most distal measurement point (measurement points 6 to 10) as being the closest (measurement point 9) to the measurement starting point 1, which is equal to or smaller than the predetermined threshold value. The return of the magnetic sensor 1 to the original position represents that the magnetic sensor 1 is rotated in the predetermined direction, and then rotated in the opposite direction to be restored for the motion sensing.

The threshold determination with respect to the distance A may prevent the error of the motion sensing resulting from the micromotion, for example, hand shaking. The threshold determination with respect to the distance B may prevent the error of the motion sensing upon the mere rotating operation.

The threshold value is set based on the magnitude of geomagnetism, and the radius of the circle formed in the X-Z-axis coordinate.

In addition to the threshold determination, the determination may further be made with respect to execution of the motion sensing when the angle defined by a virtual line which connects a midpoint between the measurement starting point and the most distal measurement point to the measurement starting point, and a virtual line which connects the midpoint to the most distal measurement point is equal to or larger than the threshold value. That is, when the angle θ defined by the virtual line C which connects the midpoint (measurement point 7) to the measurement starting point, and the virtual line D which connects the midpoint to the most distal measurement point is equal to or larger than the threshold value, execution of the motion sensing may be determined. The threshold determination with respect to the angle θ may prevent the error of the motion sensing due to the external magnetic field, for example.

The determination with respect to the rotating direction, that is, whether the rotating direction is positive or negative may be made based on the direction of the normal line of the virtual line C (the line from the measurement starting point 1 to the midpoint 7), and the direction of the normal line of the virtual line D (the line from the midpoint 7 to the most distal measurement point 5). In other words, the normal vector is obtained by subjecting the vectors of the virtual lines C and D to the outer product. The rotating direction may be defined by the positive/negative Y-axis component of the obtained normal vector. Specifically, if the Y-axis component of the normal vector is positive, the rotation is in the positive direction, and if the Y-axis component of the normal vector is negative, the rotation is in the negative direction.

In the present invention, the motion sensing is executed in the case where the predetermined rotating operation of the magnetic sensor is performed within a predetermined period of time of approximately 0.5 to 1 second. When the predetermined rotating operation is performed after the elapse of the predetermined time period, the measurement value required for the motion sensing cannot be obtained. As a result, it may be determined as the other operation, and the motion sensing is not executed.

Figure 4:
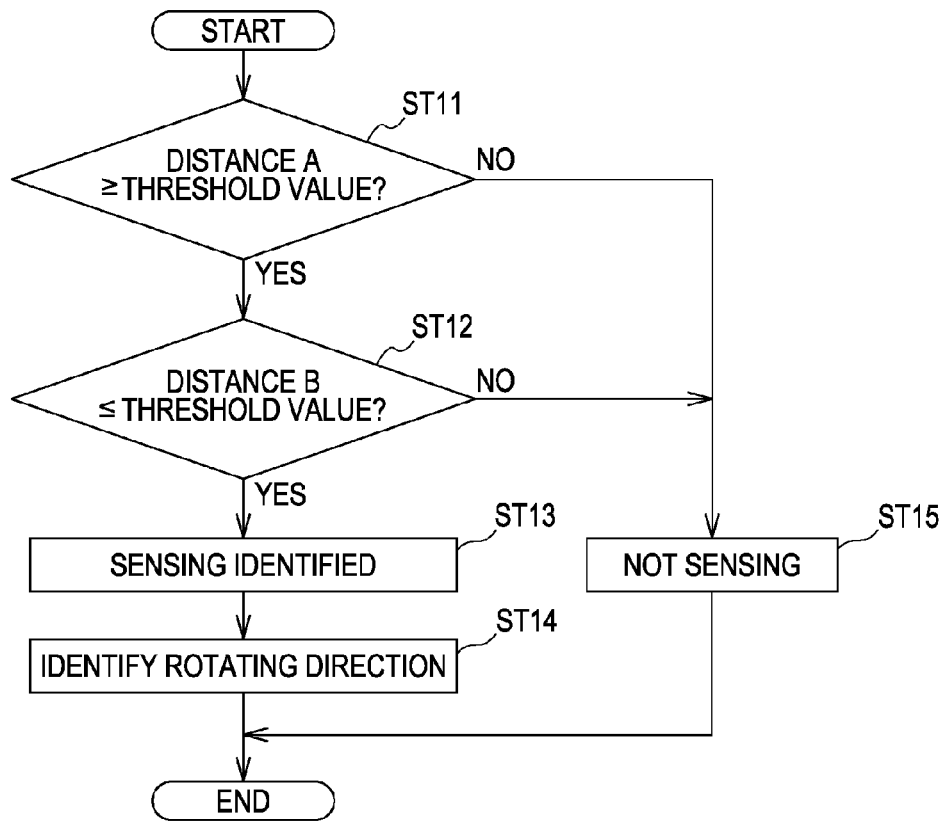
FIG. 4 is a flowchart for explaining the motion sensing executed by the motion sensing program according to an embodiment of the present invention.

The actual motion sensing will be described hereinafter. FIG. 4 is a flowchart representing the routine for the motion sensing executed by the motion sensing program according to the embodiment of the present invention.

It is assumed that the output of the X-axis sensor is set to Xout, the output of the Z-axis sensor is set to Zout, and the required number of the measurement points (output plot) is set to Pcount. It is also assumed that the threshold value of the distance (distance A) between the measurement starting point to the most distal measurement point (turnaround point) when rotating the magnetic sensor laterally is set to Dth1, and the threshold value of the distance (distance B) between the measurement starting point to the measurement point resulting from returning the magnetic sensor is set to Dth2. The time period per each plot is set to 50 msec.

Output values of X-axis and Z-axis are obtained until they are equal to or larger than Pcount. The obtained X-axis and Z-axis output values are used for providing the turnaround measurement point in the Z-X-axis output coordinate.

It is assumed that outputs at the measurement starting points are set to Xout(0) and Zout(0), and outputs upon lateral rotation of the magnetic sensor are set to Xout(i) and Zout(i), the output change is calculated as the distance based on the following equation.

$$D(i) = \sqrt{[\{Xout(i) - Xout(0)\}^2 + \{Zout(i) - Zout(0)\}^2]} \quad \text{equation (1)}$$

It is determined whether the relation of Dth1≦D(i) is established, that is, whether the distance A is equal to or larger than the threshold value (ST11). If Dth1≦D(i) is established, the measurement point corresponding to i is set as the most distal measurement point (turnaround measurement point) to store outputs of the corresponding X-axis and Z-axis. If i=k, the following equation (2) is established.

$$D(k) = \sqrt{[\{Xout(k) - Xout(0)\}^2 + \{Zout(k) - Zout(0)\}^2]} \quad \text{equation (2)}$$

The output change resulting from returning the magnetic sensor to the original position is calculated in the same way as described above. If i=end, the following equation (3) is established.

$$D(end) = \sqrt{[\{Xout(end) - Xout(end)\}^2 + \{Zout(end) - Zout(0)\}^2]} \quad \text{equation (3)}$$

It is determined whether the relation of Dth2≧D(end) is established, that is, whether the distance B is equal to or smaller than the threshold value (ST12). If Dth2≧D(end), the measurement point is set to the measurement end point to store outputs of the corresponding X and Z outputs. When the conditions are established by performing two threshold determinations, execution of the motion sensing is determined (ST13). Meanwhile, if any one of the conditions is not established by performing two threshold determinations, it is determined that the motion sensing is not executed (ST15).

The direction of the output change of the lateral rotation is identified (ST14). In this case, the output at the midpoint between the measurement starting point and the turnaround measurement point is calculated. The X-axis and the Z-axis outputs at the midpoint are obtained using the following equations (4) and (5).

$$XMP = (Xout(0) + Xout(k))/2 \quad \text{equation (4)}$$

$$ZMP = (Zout(0) + Zout(k))/2 \quad \text{equation (5)}$$

The direction of the output change of the lateral rotation (rotating direction) is identified based on the normal vector derived from the normal lines of the virtual line from the measurement starting point to the midpoint (virtual line C shown in FIG. 3) and the virtual line from the midpoint to the turnaround measurement point (virtual line D shown in FIG. 3). Each vector of the virtual lines C and D will be calculated using the following equations (6) and (7).

$$\text{Vector of virtual line } C: Cx = Xout(0) - XMP, Cz = Zout(0) - ZMP \quad \text{equation (6)}$$

$$\text{Vector of virtual line } D: Dx = Xout(k) - XMP, Dz = Zout(k) - ZMP \quad \text{equation (7)}$$

Each outer product of those vectors Cx, Cz, Dx and Dz is calculated to obtain the normal vector so as to determine whether the Y-axis component of the normal vector is positive or negative. The rotating direction is identified based on the determination result.

Figure 5:
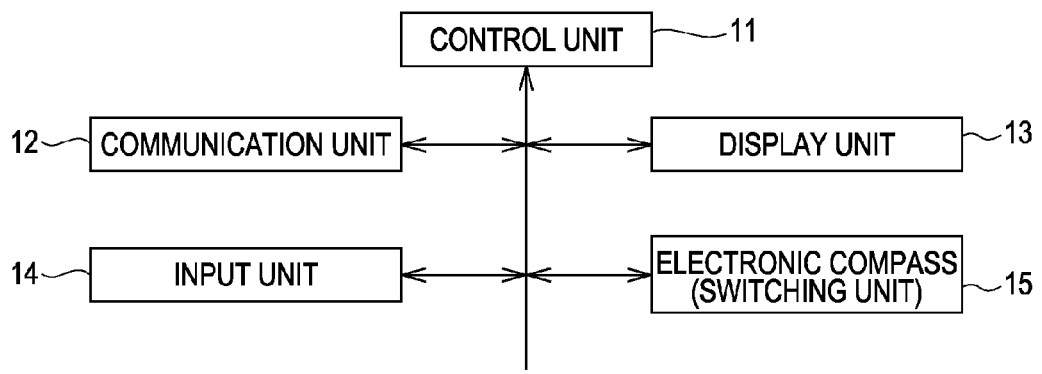
FIG. 5 is a schematic view showing a structure of a mobile terminal device equipped with an electronic compass according to an embodiment of the present invention.

FIG. 5 schematically shows the structure of the mobile terminal device having the electronic compass according to the embodiment of the present invention installed therein. The mobile terminal device shown in FIG. 5 is mainly formed of a control unit 11 for controlling the entire device, a communication unit 12 for performing the wireless communication with other communication equipment, a display unit 13 for displaying various data, an input unit 14 for inputting various data and operating the device, and an electronic compass 15 for obtaining the azimuth. The motion sensing function according to the present invention allows the electronic compass 15 to perform a switching operation, functioning as a motion switch for outputting to the control unit 11 by detecting the motion. As the electronic compass 15 serves as the motion switch, the mobile terminal device is capable of inputting the direction and switching the function without installing the additional sensors. It is assumed that the mobile terminal device includes the other devices normally installed in the mobile terminal device.

Figure 6:
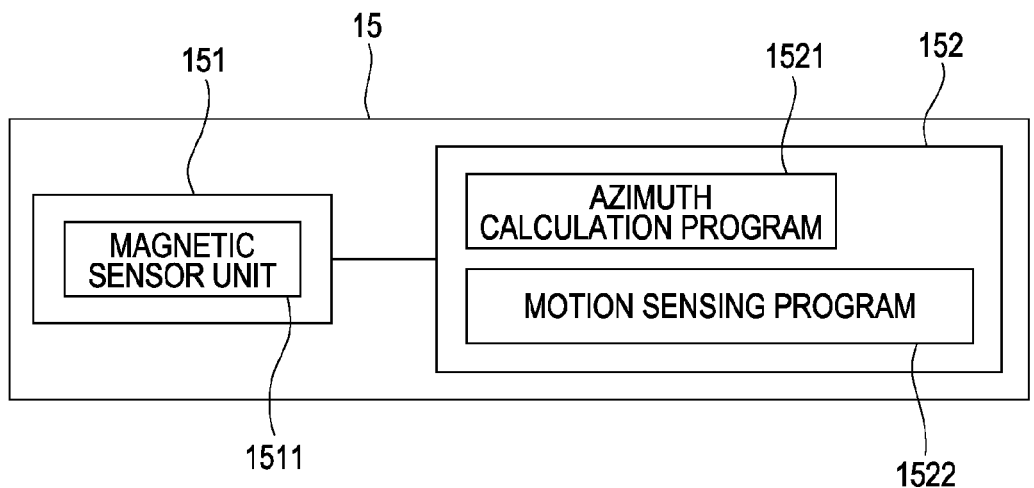
FIG. 6 is a block diagram schematically showing the structure of the electronic compass according to an embodiment of the present invention.

FIG. 6 is a block diagram schematically showing the structure of the electronic compass according to the embodiment of the present invention. The electronic compass 15 shown in FIG. 6 mainly includes a compass module 151 and a control unit 152. The compass module 151 includes a magnetic sensor unit 1511. The control unit 152 includes an azimuth calculation program 1521 for obtaining the azimuth based on the output of the magnetic sensor unit 1511, and a motion sensing program 1522 for executing the motion sensing based on the output of the magnetic sensor unit 1511.

The magnetic sensor of the magnetic sensor unit 1511 in the compass module 151 is designed to be adaptable to at least triaxial type for detecting magnetism. Any type of the sensor element may be used for forming the magnetic sensor. For example, a GMR (Giant MagnetoResistance) element, a GIG (Granular In Gap) element and a hall element may be employed as the sensor element. The compass module 151 includes a processing unit for applying voltage and magnetic field to the magnetic sensor unit 1511 and the processing unit for converting the analog signal from the magnetic sensor unit 1511 into the digital signal.

The control unit 152 includes at least the azimuth calculation program 1521 and the motion sensing program 1522 as the driver software for driving the compass module 151. The routine of the azimuth calculation program 1521 is not limited so long as the azimuth angle corresponding to the reference direction is obtained based on the magnetic detection information from the compass module 151.

The motion sensing program 1522 is executable by the computer for the motion sensing based on at least biaxial outputs of the magnetic sensor. The motion sensing program includes the steps of determining with respect to execution of the motion sensing based on the specific biaxial outputs of the magnetic sensor upon rotation of the magnetic sensor in the predetermined direction within the predetermined time period, and identifying the rotating direction when execution of the motion sensing is determined.

The motion sensing program allows identification of the rotating direction so as to execute the accurate motion sensing without requiring such processing as calibration. In the motion sensing program, the distance in the output coordinate of X-axis and Z-axis among X-, Y-, and Z-axis is obtained, based on which the threshold determination is made to execute the motion sensing. This makes it possible to prevent the error of the motion sensing resulting from the micromotion such as the hand shaking, and the mere rotating operation.

Figure 7:
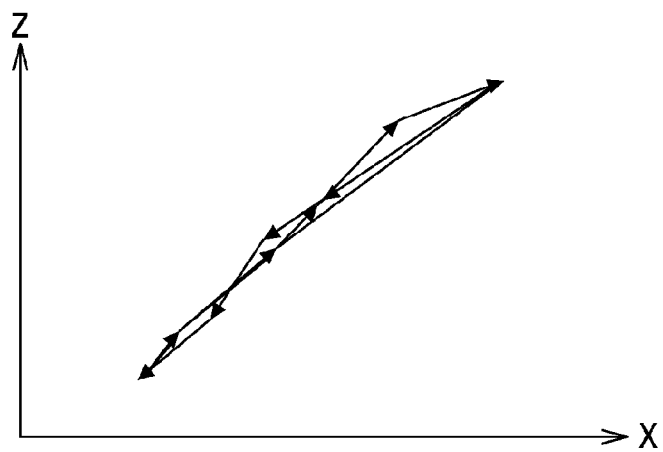
FIG. 7 is a view for explaining the advantage of the present invention.

In the technical concept of the present invention on the assumption that the magnetized object passes around the mobile terminal device, outputs are plotted on the linear track in the Z-X-axis coordinate as shown in FIG. 7. In the technology disclosed in Japanese Unexamined Patent Application Publication No. 2006-128789, it is determined whether the motion data are obtained based only on each comparison between the X-axis output and the predetermined threshold value, and between the Z-axis output and the predetermined threshold value. In the case as shown in FIG. 7, if the respective outputs of the X-axis and Z-axis exceed the predetermined threshold values, the motion data are obtained. It is highly likely to erroneously determine that the motion is effective in spite of being under the influence of the outer magnetic field. Meanwhile, according to the present invention, in the case as shown in FIG. 7, the angle θ becomes substantially 0, and does not exceed the predetermined threshold value. Accordingly, the operation is not determined as the motion. This makes it possible to prevent the error under the influence of the outer magnetic field.

The motion sensing according to the present invention may be executed in the leaked magnetic field by correction using the coil of the magnetic sensor. Even if the outer magnetic field changes, the motion sensing may be normally executed by the correction performed by the coil of the magnetic sensor, thus preventing the error.

The present invention is applicable to the device without the electronic compass, for example, the mobile terminal device. In other words, it is applicable to the mobile terminal device provided with the magnetic sensor and the control unit having the motion sensing program for executing the motion sensing based on the magnetic sensor outputs, and the azimuth calculation program for obtaining the azimuth based on the magnetic sensor outputs for inputting the direction and switching the function through the motion sensing.

The present invention may be modified into various forms without being limited to the aforementioned embodiment. In the embodiment, the magnetic sensor is rotated in the lateral direction. However, the present invention is not limited to the aforementioned rotating direction. It may be applicable to the horizontal and longitudinal rotating directions. In the embodiment, the motion sensing program is applied to the switching operation of the mobile terminal device. However, the motion sensing program according to the present invention is applicable to the switching operation of any other device. In the embodiment, the compass module and the control unit are separately structured in the electronic compass. In the present invention, the compass module and the control unit may be integrally formed. The present invention may be changed so long as it does not deviate from the scope thereof.

What is claimed is:

1. A method of motion sensing based on at least a biaxial output of a magnetic sensor, comprising the steps of:
   determining with respect to execution of the motion sensing based on a specific biaxial output of the magnetic sensor upon its rotation in a predetermined direction within a predetermined period of time; and
   identifying a rotating direction of the magnetic sensor when the execution of the motion sensing is determined,
   wherein in the step of determining with respect to execution of the motion sensing, the execution of the motion sensing is determined when a distance between a measurement starting point to a most distal measurement point from the measurement starting point in a coordinate of the specific biaxial output of the magnetic sensor is equal to or larger than a first predetermined value, and a distance between a measurement point resulting from substantially returning the magnetic sensor to a rotation starting position and the measurement starting point is equal to or smaller than a second predetermined value.

2. An electronic compass comprising:
   a compass module equipped with a magnetic sensor; and
   a control unit provided with a motion sensing program to perform the method according to claim 1 for executing a motion sensing based on an output of the magnetic sensor, and an azimuth calculation program for obtaining an azimuth based on the output of the magnetic sensor.

3. A mobile terminal device comprising the electronic compass according to claim 2 installed therein to obtain the azimuth and perform a switching operation.

4. The mobile terminal device according to claim 3, wherein the magnetic sensor is rotated in the predetermined direction with respect to an axis of a longitudinal direction in a plane of the device surface.

5. A mobile terminal device comprising:
a magnetic sensor; and
a control unit provided with the motion sensing program to perform the method according to claim 1 for executing the motion sensing based on an output of the magnetic sensor, and an azimuth calculation program for obtaining an azimuth based on the output of the magnetic sensor, wherein a switching operation is performed by the motion sensing.

6. The mobile terminal device according to claim 5, wherein the magnetic sensor is rotated in the predetermined direction with respect to an axis of a longitudinal direction in a plane of the device surface.

7. A method of motion sensing based on at least a biaxial output of a magnetic sensor, comprising the steps of:
determining with respect to execution of the motion sensing based on a specific biaxial output of the magnetic sensor upon its rotation in a predetermined direction within a predetermined period of time; and
identifying a rotating direction of the magnetic sensor when the execution of the motion sensing is determined, wherein in the step of identifying the rotating direction, the rotating direction is identified based on a direction of a normal vector defined by a virtual line which connects a midpoint between a measurement starting point and the most distal measurement point to the measurement starting point, and a virtual line which connects the midpoint to the most distal measurement point.

8. An electronic compass comprising:
a compass module equipped with a magnetic sensor; and
a control unit provided with a motion sensing program to perform the method according to claim 7 for executing a motion sensing based on an output of the magnetic sensor, and an azimuth calculation program for obtaining an azimuth based on the output of the magnetic sensor.

9. A mobile terminal device comprising the electronic compass according to claim 8 installed therein to obtain the azimuth and perform a switching operation.

10. A mobile terminal device comprising:
a magnetic sensor; and
a control unit provided with the motion sensing program to perform the method according to claim 7 for executing the motion sensing based on an output of the magnetic sensor, and an azimuth calculation program for obtaining an azimuth based on the output of the magnetic sensor, wherein a switching operation is performed by the motion sensing.

11. The mobile terminal device according to claim 10, wherein the magnetic sensor is rotated in the predetermined direction with respect to an axis of a longitudinal direction in a plane of the device surface.

* * * * *